United States Patent Office 3,408,962
Patented Nov. 5, 1968

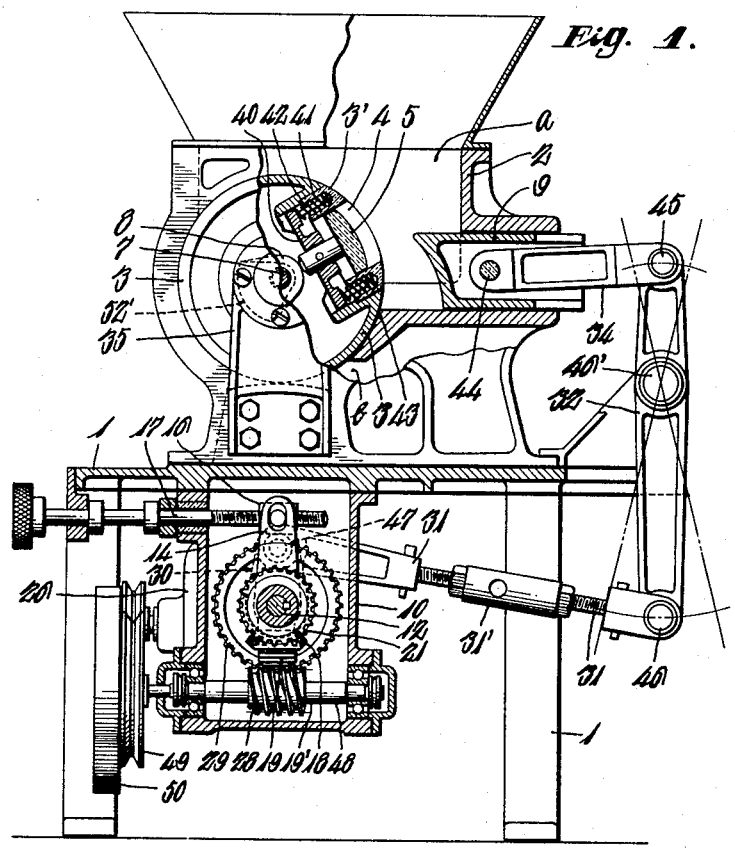

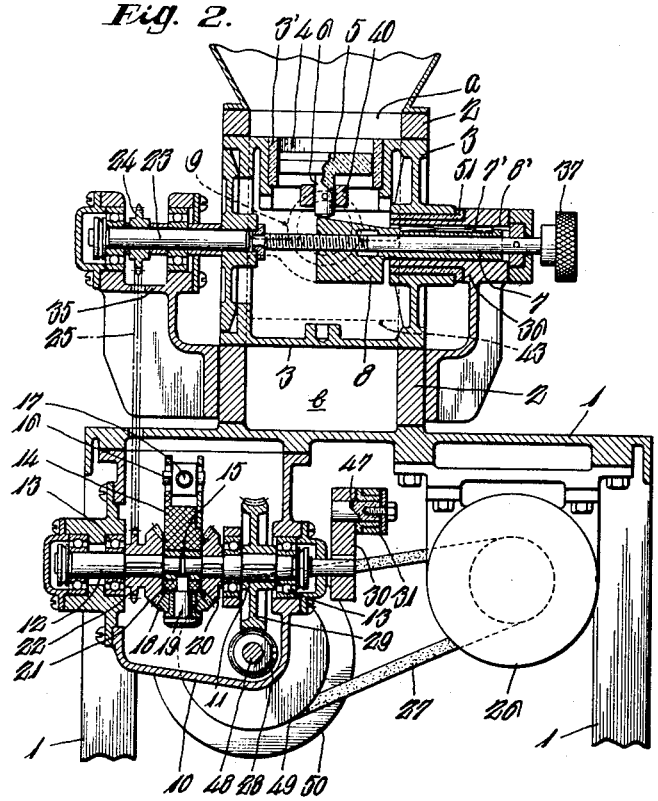
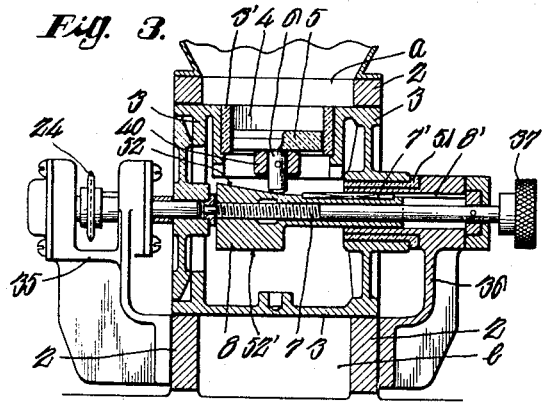

3,408,962
MOLDING MACHINE FOR FOODSTUFFS
Hideaki Nishimura, Uji, Japan, assignor to Nantsune Tekko Kabushiki Kaisha (Nantsune Iron Works Limited), Osaka, Japan
Filed June 23, 1966, Ser. No. 559,945
Claims priority, application Japan, Aug. 19, 1965, 40/50,666
3 Claims. (Cl. 107—15)

ABSTRACT OF THE DISCLOSURE

A dough molding or handling machine provided with a mechanism for forming a dough or kneaded material into a desired shape automatically for mass production of various shaped food products and principally croquette and minced meat balls. In addition, a mechanism for varying the thickness of the molded products freely and a mechanism for varying a timed relationship between the rotational movement of a rotary drum equipped with a concave molding chamber on its surface is provided. The horizontal movement of a co-acting piston member in accordance with the hardness of the dough to be used is present for obtaining products of optimum hardness.

---

The present invention relates to molding machines and more specifically to molding machines of a type suitable for use for large and continuous production of molded products, particularly molded foodstuffs, of desired shape from a dough or kneaded food materials.

The principal object of the present invention is to provide a molding machine of a novel structure for the above purpose, which is not only easy and simple to operate but also capable of performing a combination of various unique functions which cannot be accomplished by any known type of molding machine. For example, the machine under the present invention can produce molded products of different thicknesses as well as uniform thickness by a unique means provided in conjunction with an improved mechanism for conventional molding operation. While, as stated already, this machine is adapted for production of molded products from all kinds of dough and kneaded materials, it is particularly suitable for large production of desired shape of processed foodstuffs such as croquette, minced meat balls, Hamburg steak.

The molding machine in accordance with the present invention comprises a drum member having a concave chamber on its periphery and mounted rotatably inside a hopper which is provided in a casing, and a piston member provided at right angles to the drum in such a manner as to move sideways towards or away from the concave chamber in timed relation with the revolution of the drum. Under such arrangements, when the concave chamber on the drum comes to take its position opposite the moving path of the piston with the rotation of the drum, the piston is caused to thrust forward toward the drum, pressing a molding material or dough previously packed inside the hopper into the concave chamber, whereupon the molding chamber has been loaded. The molding material or dough thus packed tightly in the chamber is discharged therefrom when the chamber reaches its lowest position with further rotation of the drum, delivering the first molded product. This operation is repeated continuously to produce molded goods of a shape conforming to the shape of the molding chamber.

In combination with the above-described operation which is more or less conventional, the molding machine of the present invention is capable of varying the thickness of products to be obtained, by means of an adjusting diaphragm member provided at the bottom of the concave chamber, which is operated by an externally manipulating means to move up and down inside the chamber during the rotation of the drum, thereby varying the depth of the chamber and hence the thickness of molded products obtained as desired.

Still another object of the present invention is to provide a novel mechanism whereby, according to the hardness of molding material or dough used, the timing of forward thrust of the piston member in relation to the rotation of the chamber, that is, the timing of engagement of the piston head in the molding chamber may be adjusted slow or fast as desired, in order to obtain best results. This is very effective as, depending on the softness or hardness of the molding material used, better results can be obtained by giving gap in timing between the movement of the piston and the rotation of the chamber rather than maintaining engagement of the two parts in the same timing relationship at all times.

The nature and further advantages of the present invention will be known more clearly from the following description made with reference to the accompanying drawings, in which:

FIG. 1 is a side elevation of the machine in accordance with my invention, with a hopper means partly in section to show the relationship between a concave chamber provided in a drum and a piston means co-acting therewith, and also with a casing partly in section to show a mechanism for adjusting a timed relationship between the movements of the concave molding chamber and piston.

FIG. 2 is a cross-sectional front view of the whole of the molding machine shown in FIG. 1.

FIG. 3 is a cross-sectional front view, showing a means mounted on the axis of the drum for varying the depth of the concave chamber provided on the drum.

FIG. 4 is a cross-sectional side view, showing a manipulating means for adjusting the timing of operation of the piston member in relation to the rotation of the concave chamber.

FIG. 5 is a plan view of the drum, showing the concave molding chamber provided therein.

Now, referring to the drawings, the numeral 1 designates a bed and 2 designates a casing provided on the bed and carrying a hopper means *a* at its upper part inside. Provided also inside the casing 2 is a rotary drum 3 having its both ends rotatably disposed in the holes provided on both the right and left side walls of the casing 2 so as to permit its free rotation.

In the peripheral surface of the drum 3, a molding block 3′ carrying thereon a concave chamber 4 of a desired shape is buried. This concave chamber 4, constituting a molding chamber, is so formed as to fit the external shape of molded products to be obtained. The concave molding chamber 4 is provided at its bottom an adjustable diaphragm member 5 carrying at the center of its undersurface a support foot or rod member 6 which has its free end in constant contact with the periphery of a cam 8. The cam 8 has its base end terminated into a tubular structure which is accommodated rotatably in a bearing sleeve 36 provided at the right-hand side of the casing 2. The foot or rod member 6 carries at its mid-point an arm member 40 having its both ends connected to spring means 42 accommodated in holes 41 provided inside the side walls of the molding block 3′. With this arrangement, the diaphragm member 5 is normally held at the bottom of the chamber 4 by the force of the spring means 42, constituting an adjustable bottom part for the chamber 4.

The tubular base end of the cam 8 is terminated into an extension or a projection 7′ forming a guide rail slidably accommodated in a guide groove 8′ provided in the hole of the bearing sleeve 36.

Said bearing sleeve 36 accommodates therein a screw shaft 7 having its threaded inner end engaging the threaded part provided at the core part of the cam 8. The screw shaft 7 carries a handle 37 at its external end and when the handle is turned, the screw shaft 7 is caused to rotate but without actuating rotation of the cam 8 as it is prevented from rotating by means of the extension rail 7' engaging the guide groove 8' of the sleeve 36. However, the cam 8 is caused to slide forward or backward on the screw shaft 7, resulting in similar movement of the sloped periphery 52 of the cam 8, whereupon the foot member 6 of the diaphragm member 5 contacting the cam periphery 52 is raised or lowered, thus actuating the up and down movement of the diaphragm member 5 and in so doing, varying the depth of the molding chamber 4 as desired.

On the other hand, when the drum 3 is rotated, the foot member 6 is caused to rotate together with the drum, following the cam periphery 52. In this case, as long as the foot 6 is held in contact with the slope 52 of the cam 8, the diaphragm member 5 remains at the bottom of the concave molding chamber 4 with the result that the chamber is kept at its normal depth. When, however, the foot or rod member 6 goes over the opposite side of the slope 52 and rides on the highest part 52' of the cam periphery 52, i.e. where the diameter of the cam is greatest, the diaphragm 5 is pushed up to the top of the chamber 4 to align itself with the surface of the drum 3, with the result that the concave chamber 4 virtually goes out of existence.

Referring then to a mechanism for actuating the rotation of the drum 3, a shaft 23 is rigidly secured to the left-hand side of the drum 3. The shaft 23 is received in a bearing bracket 35 fitted to the left-hand side of the casing 2, and to the shaft 23, a chain wheel 24 is also fixed. On the other hand, mounted in the box 10 fitted to the undersurface of the bed 1 is a rotatory shaft 12 which is received at its one end in a bearing 13 and carrying another chain wheel 24 fixed thereto. By means of a chain 25 disposed to engage both first and second mentioned chain wheels 22 and 24 to transmit a driving motion, the drum 3 is caused to rotate through the shaft 23 and the supporting point of a bushing 51 mounted over the right-hand bearing sleeve 36.

Provided axially with said rotatory shaft 12 is a driving shaft 11 rotatably supported by the bearing 13 on the right-hand side of the box 10. The inner ends of the respective shafts 12 and 11 are inserted from both sides into a hole 15 provided at the base end of an arm 14 and they are held rotatably in that position. Fixed to the respective shafts 11 and 12 are bevelled gears 20 and 21 which are both disposed to engage an intermediary gear wheel 18 movably connected to the arm 14 by means of a pin 19. The arm 14 is provided at its tip with a female screw ring 16 by means of which the arm 14 is tightened to a manipulating screw shaft 17 inserted there from the outside of the box 10.

Rigidly secured to the driving shaft 11 are a crank arm 30 and a worm wheel 29, the latter being disposed to engage a worm 28 fixed to a shaft 48 mounted in the box frame by a suitable means. When a motor 26 fitted to the underside of the bed 1 is put into motion, the driving shaft 11 is caused to rotate by means of a belt 27 engaging over the motor 26 and a pulley 49 fixed to the side surface of a fly wheel member 50, whereupon the crank arm 30 rotates, thereby swinging by means of a rod 31 having its base end secured to the crank 30 and carrying a turnbuckle 31' thereon, a lever 32 on the pivot point 46' at which one end of the lever 32 is pivotally secured to the bed 1. On the other hand, this lever 32 has its upper end connected by means of a set pin 45 to the external end of a connecting rod 34 which is pivotally secured by means of a pin 44 to the piston member 9 provided in the casing 2 and having its head project into the hopper a.

Under such arrangements, as soon as the concave member 4 of the slow-turning drum 3 reaches a position opposite the location of the piston 9, said piston 9 thrusts deeper into the hopper a, pressing a molding dough packed there into chamber 4 with its head portion. As the chamber 4 rotates further, an excess dough overflowing the chamber 4 is scraped off by the bottom side-wall of the hopper a, which is disposed to contact the periphery of the drum at all times. When the chamber 4 thus filled up with the molding dough turns further with rotation of the drum 3, the foot 6 for the diaphragm 5 of the chamber 4 gradually rides on the highest part 52' of the cam 8, pushing the diaphragm 5 and hence the dough packed in the chamber 4 outward until the molded dough drops down into a discharge chamber b provided underneath the drum 3.

Furthermore, the present invention has a characteristic advantage in that it permits the machine, while performing the above-described molding operation, to vary the volume of molded products by changing their thickness and to adjust the timing of the stroke of the piston 8 in relation to the concave chamber 4 according to the hardness of molding material used, by the following mechanisms.

When the screw shaft 7 is rotated by the manipulating handle 37, the cam 8 is caused to slide forward or backward and to hold the foot or rod member 6 at an upper point or a lower point of the sloped periphery 52 of the cam 8, thereby settling the diaphragm member 5 higher or lower and adjusting the depth of the concave chamber 4 larger or smaller. Thus, the thickness of molded products can be made larger or smaller as desired.

By turning the manipulating screw shaft 17, the arm piece 14 is caused to slide through the medium of the female screw ring 16 engaging said manipulating screw shaft, whereupon the intermediary gear wheel 18 rotates as it is engaging and moving on the teeth of the bevelled gear 20, but without actuating the rotation of the latter 20 because of the worm-wheel 29 of its main driving shaft 11 engaging the worm 28. At the same time, another bevelled gear 21 engaging said intermediary bevelled gear 18 is also caused to rotate. This rotatory motion is transmitted to the shaft 23 through the medium of the chain wheel 22, the chain belt 26 and another chain wheel 24, whereupon the drum 3 to which the shaft 23 is fixed is caused to rotate. While the drum is being rotated in this way, it can be moved forward in relation to its rotatory direction (normal rotation) or backward in relation to its rotatory direction (reverse rotation) by making the arm 14 slide rightward of leftward as desired through the operation of the manipulating screw shaft 17. By means of this control operation, the revolution of the drum 3 in relation to the timing of the thrust of the piston can be made fast or slow and thus the timing of the stroke of the piston can be controlled according to the hardness of molding material.

Having thus described the nature of the present invention, what I claim herein is:

1. A molding machine of the type described, comprising a casing, a hopper means provided inside the casing, a rotary drum provided inside said hopper means and carrying a concave chamber on its periphery, a piston member mounted in the casing in such a manner as to move sideways toward the drum during the rotation of the latter and press a molding material packed in the hopper means into said concave chamber, an adjustable diaphragm member movably provided at the bottom of said concave chamber of said rotary drum, and a support foot member protrudingly established on the underside of said diaphragm member and having its free end in constant contact with the periphery of a cam, said cam being so disposed as to engage a screw shaft pivotally mounted in the axis of the drum and also supporting the foot member with its sloped surface thereby adjusting the position of said diaphragm member higher or lower by means of different heights of the cam periphery.

2. A molding machine of the type described, comprising a casing, a hopper means provided inside the casing, a rotary drum located inside said hopper means and carrying a concave chamber on its periphery, a piston member mounted in the casing in such a manner as to move sideways toward the drum during the rotation of the latter and press a molding material packed in the hopper means into said concave chamber, a chain wheel rigidly secured to the rotary shaft of the drum, a transmission shaft rotatably supported on the side wall of a box provided underneath a bed, said transmission shaft carrying thereon another chain wheel for engagement with said first chain wheel by means of a chain belt disposed between said two chain wheels, a main driving shaft rotatably mounted in the opposite side wall of the box in alignment with said transmission shaft, an arm member accommodating in its hole the respective inner ends of the main driving shaft and transmission shaft, an intermediary gear wheel carried at the base end of said arm member, bevelled gear wheels fixed to said driving shaft and transmission shaft for operable connection with said intermediary gear wheel, a worm wheel fixed to the rotatable driving shaft, another worm member carried on another shaft, said worm member being so arranged as to engage first mentioned worm wheel, a female screw ring at the end of said arm member, a manipulating screw shaft inserted from the outside of the box for engagement with said female screw ring, and said manipulating screw shaft being rotatably supported in the box frame by a suitable means.

3. The molding machine of the construction defined in claim 2, including a crank member mounted on the main driving shaft, a rod member secured to the base end of said crank, a lever at the external end of said rod member and a connecting rod linked to the upper end of said lever to connect said lever to the piston member.

References Cited

UNITED STATES PATENTS

| | | | |
|---|---|---|---|
| 934,183 | 9/1909 | Kaiser | 107—15 |
| 1,229,188 | 6/1917 | Ward | 107—15 |
| 1,869,033 | 7/1932 | Van Houten | 107—4 |

WALTER A. SCHEEL, *Primary Examiner.*

A. O. HENDERSON, *Assistant Examiner.*